United States Patent
Thede

(10) Patent No.: US 6,412,568 B1
(45) Date of Patent: Jul. 2, 2002

(54) SPRINKLER HEAD EDGING DEVICE

(76) Inventor: Robert W. Thede, 40801 State Ct., Palmdale, CA (US) 93551

( * ) Notice: Subject to any disclaimer, the term of this patent is extended or adjusted under 35 U.S.C. 154(b) by 0 days.

(21) Appl. No.: 09/655,332

(22) Filed: Sep. 5, 2000

Related U.S. Application Data

(60) Provisional application No. 60/152,093, filed on Sep. 2, 1999.

(51) Int. Cl.[7] .............................................. A01D 15/00
(52) U.S. Cl. .............................. 172/13; 172/21; 172/25
(58) Field of Search .............................. 172/13, 21, 25, 172/41, 111; 30/300, 310, DIG. 7

(56) References Cited

U.S. PATENT DOCUMENTS

| | | | |
|---|---|---|---|
| 2,615,246 A | * 10/1952 | Littig ........................... | 30/300 |
| 2,670,537 A | * 3/1954 | Campbell ..................... | 30/300 |
| 2,809,864 A | * 10/1957 | Carr ............................. | 172/13 |
| 3,143,176 A | * 8/1964 | Drane, Jr. .................... | 172/13 |
| 3,554,293 A | * 1/1971 | Aman et al. .................. | 172/25 |
| 3,680,639 A | 8/1972 | Davis ........................... | 172/15 |
| 3,747,213 A | * 7/1973 | Green et al. .................. | 30/300 |
| 3,814,189 A | 6/1974 | Thompson .................... | 172/13 |
| 3,923,102 A | * 12/1975 | Morris .......................... | 172/13 |
| 3,938,249 A | * 2/1976 | Chacon ......................... | 30/300 |
| 3,960,218 A | * 6/1976 | Atchley et al. ................ | 30/310 |
| D242,894 S | * 1/1977 | Harris ............................ | D8/8 |
| 4,209,903 A | * 7/1980 | Owens .......................... | 30/302 |
| 4,260,026 A | * 4/1981 | Deckert ........................ | 172/25 |
| 4,832,131 A | 5/1989 | Powell et al. ................. | 172/25 |
| 5,242,024 A | * 9/1993 | Van Houten ............. | 30/DIG. 7 |
| 5,461,788 A | 10/1995 | Taylor .......................... | 300/300 |
| 5,493,783 A | * 2/1996 | Oostendorp .................. | 30/276 |
| 5,862,658 A | * 1/1999 | Howard ....................... | 172/111 |
| 5,938,290 A | 8/1999 | Mikeska ....................... | 300/30 |

* cited by examiner

Primary Examiner—Robert E. Pezzuto
Assistant Examiner—Nathan Mammen
(74) Attorney, Agent, or Firm—Dennis W. Beech

(57) ABSTRACT

The sprinkler head edging device has a cutting assembly attached to a handle or other device such as a powered rotational device. The cutting assembly has cutting blades attached which are oriented to cut and remove grass, weeds, dirt and other materials from around the periphery of a sprinkler head. The cutting assembly housing is generally a hollow cylindrical shape and may have a different diameter at each end of the housing for ease in changing the cutting head to accomodated varying size sprinkler heads. In the instance of the variable shaped housing the cutting assembly is rotatably attached to the handle or other device.

8 Claims, 3 Drawing Sheets

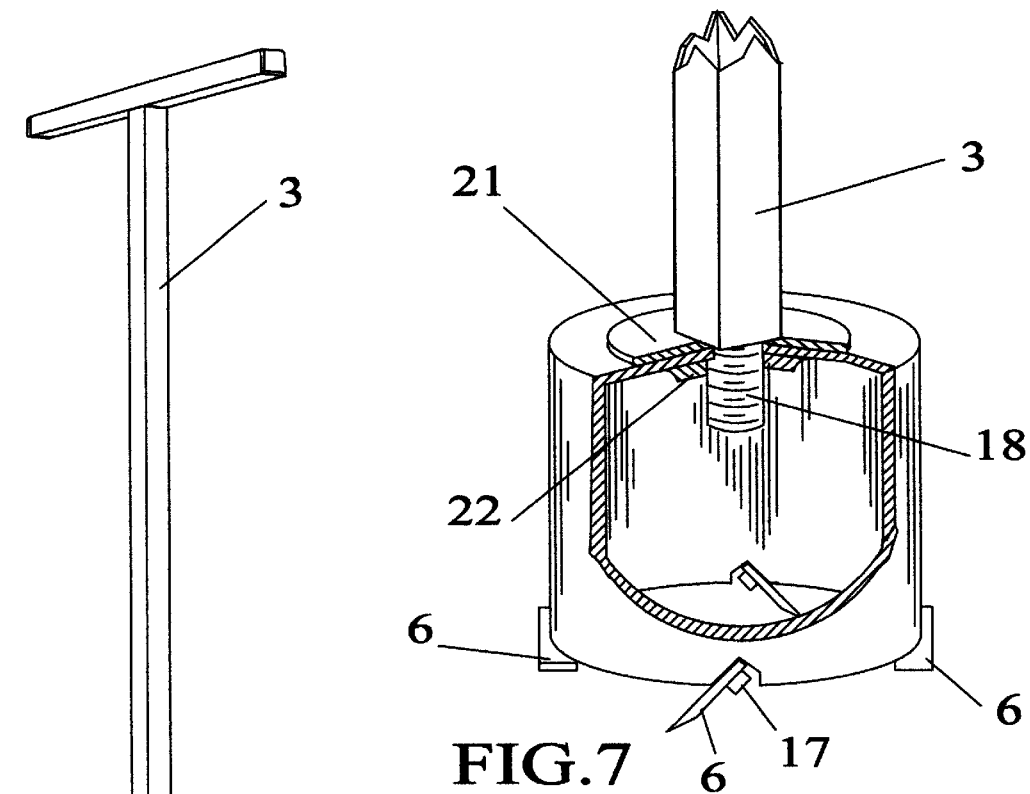
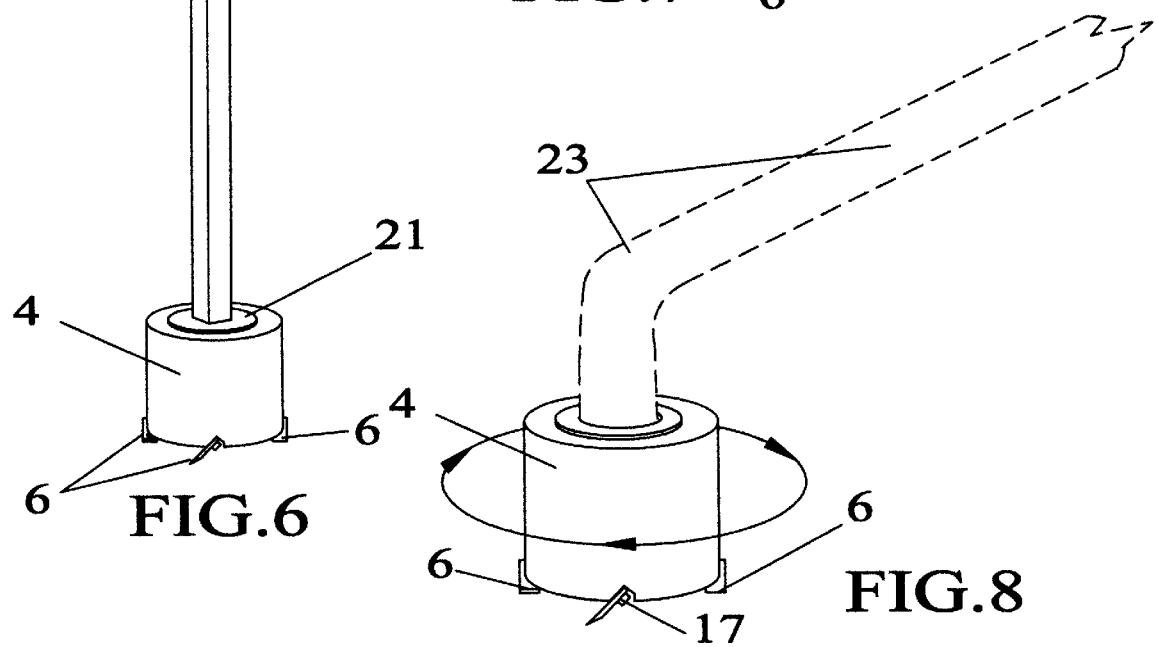
FIG.6  FIG.7  FIG.8

SPRINKLER HEAD EDGING DEVICE

This application claims the benefit of previously filed U.S. Provisional Application No. 60/152,093 filed on Sep. 2, 1999.

BACKGROUND OF THE INVENTION

1. Field of the Invention

This invention relates to devices used to remove grass and weeds from around lawn and garden in ground sprinkler heads. The improved device includes angular, replaceable cutting blades and a dual size cutting assembly for easy adjustment to varying size sprinkler heads.

2. Description of the Related Art

There are currently disclosed various devices for removal of grass and weeds from around lawn and garden sprinkler heads. Two examples of such devices are disclosed in U.S. Pat. Nos. 5,461,788 and 5,938,290, issued Oct. 31, 1995 and August 17, 1999 respectively. Both of these patents survey prior art related to sprinkler head trimming devices.

In the instance of U.S. Pat. No. 5,938,290 a grass trimmer having a handle and a tubular cutting assembly is disclosed. The tubular cutting assembly attached to the handle is of a single diameter when mounted for a grass trimming operation. In addition the lower cutting edge is comprised of a V-shaped cutting edge. There is no provision for simple, rapid change in the diameter of the tubular cutting assembly to adapt the device to varying sizes of sprinkler heads.

U.S. Pat. No. 5,461,788 discloses a simple cylindrical cutting assembly resembling the outer perimeter of a typical key hole saw. In fact the cutting edge is a series of V-shaped teeth similar to such saws. The cylindrical cutting assembly is attached to a handle by means of a threaded bolt. While the cylindrical cutting assembly may be removed by removing the bolt with accompanying nut, this is not a simple procedure if the user desires to quickly change the cylindrical cutting assembly to accommodate different sizes of sprinkler heads. The tooth edge of the cutting assembly is very narrow such that not much grass, weeds or other material is removed from around the sprinkler head when the device is rotated.

The present invention provides a sprinkler head edging device which is easily attached to a handle or other rotational device by a pin. The cylindrical cutting assembly can accommodate various width cutting blades to allow for removal of a quantity of grass, weeds, dirt or other material from around the periphery of the sprinkler head. The cutting assembly may also be constructed to rotate about the attachment pin retaining the cutting assembly to the handle. This allows the use of two different diameter cutting heads to accommodate different size sprinkler heads.

SUMMARY OF THE INVENTION

One object of the present invention is improved ease of interchange of cutting heads of a sprinkler edging device to accommodate varying sizes of sprinkler heads. Another object is ease of exchange of cutting blades attached to a cutting head. A further object is to allow modification of the cylindrical cutting assembly for attachment to powered rotational devices such as a rotating weed trimming device for general lawn use such as edging.

In accordance with the description presented herein, other objectives of this invention will become apparent when the description and drawings are reviewed.

BRIEF DESCRIPTION OF THE DRAWING

FIG. 6 illustrates a perspective view of an alternate embodiment of the invention with a single diameter cutting head.

FIG. 7 illustrates a partial cut away perspective view of the alternate cutting head.

FIG. 8 illustrates attachment of the alternate cutting head to a powered rotational trimming device.

DESCRIPTION OF THE PREFERRED EMBODIMENT

The sprinkler head edging device has a cutting assembly attached to a handle or other device for use in rotating the cutting assembly about a sprinkler head. The cutting assembly has attached cutting blades which are positioned to remove grass, weeds, dirt and other materials from around the periphery of a sprinkler head. The cutting assembly may be constructed such that each end has a different diameter cylindrical housing for ease in changing the cutting head to accommodate varying size sprinkler heads.

Figure 1:
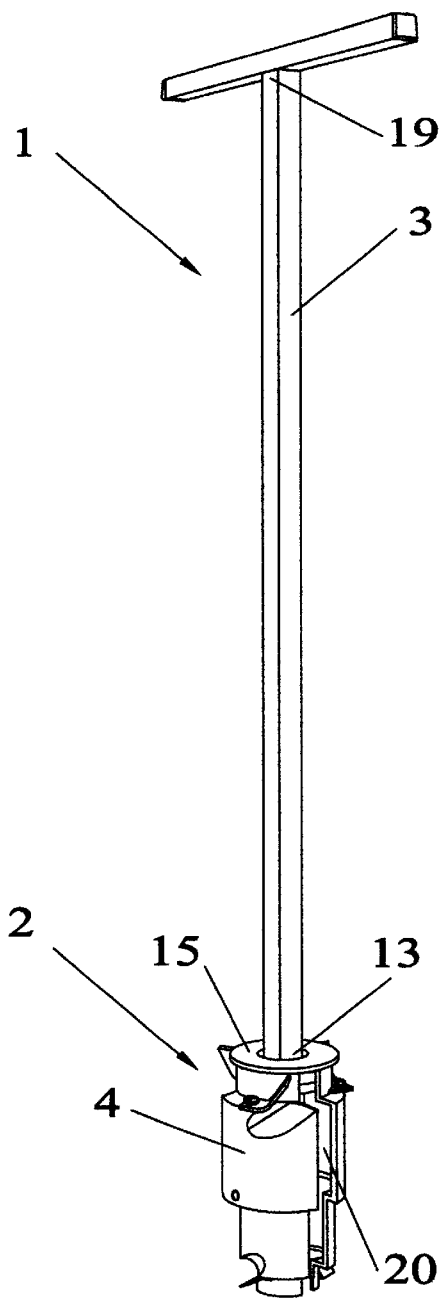
FIG. 1 illustrates a perspective elevation view of the sprinkler head edging device.
Figure 2:
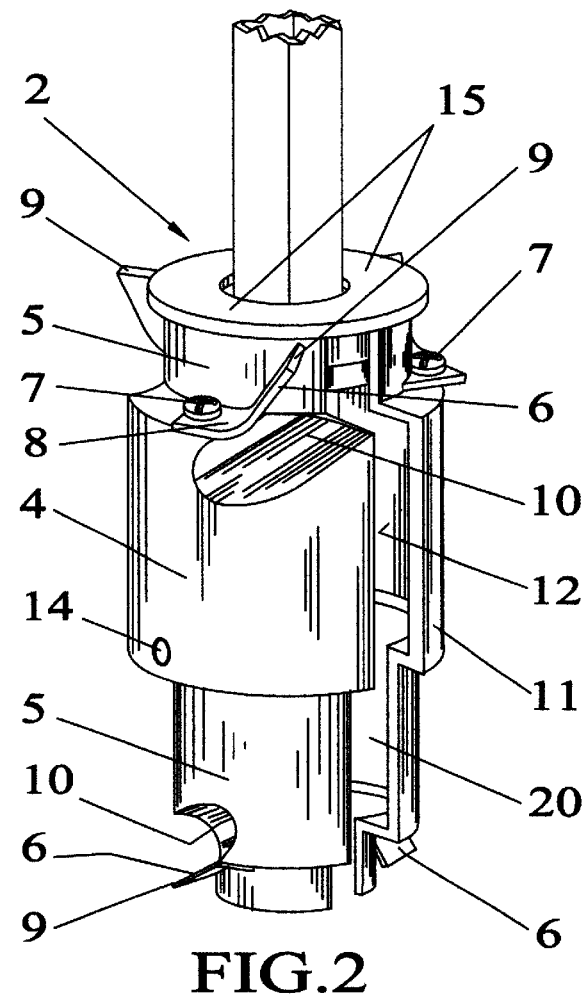
FIG. 2 illustrates a perspective view of the cylindrical cutting assembly
Figure 3:
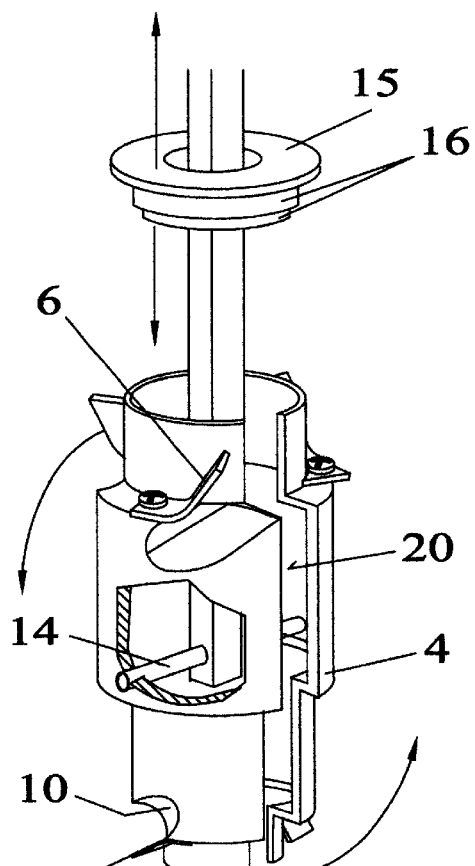
FIG. 3 illustrates a perspective view of the cutting assembly with the sliding cap disengaged.
Figure 4:
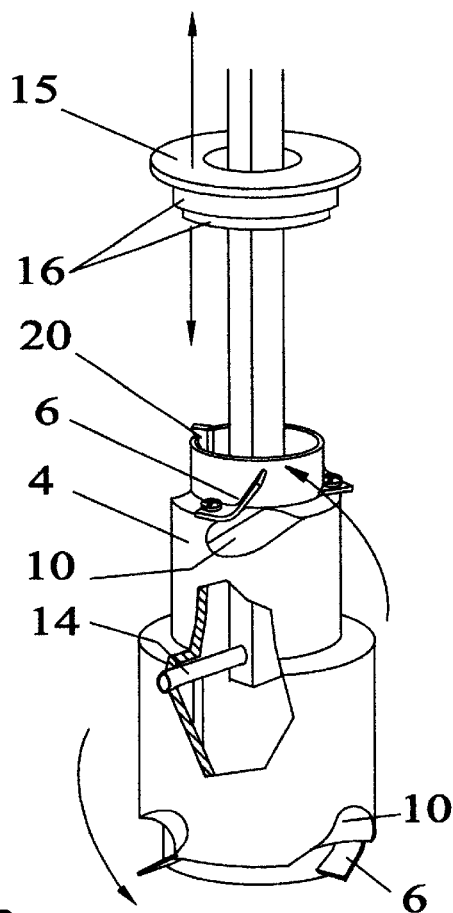
FIG. 4 illustrates a bottom view of the cutting assembly.
Figure 5:
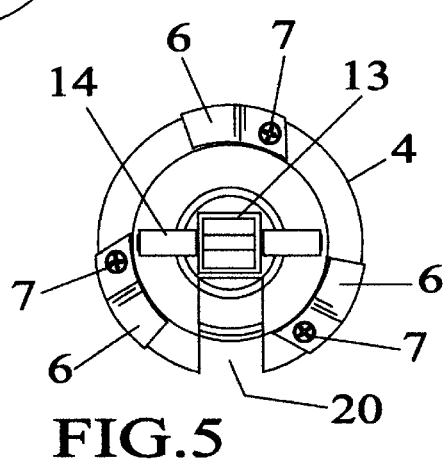
FIG. 5 illustrates a perspective view of the cutting assembly with the larger diameter cutting head in the operating position.

Referring to FIGS. 1 through 5, the sprinkler cutting head device (1) has a cutting assembly (2) attached to a handle (3). The cutting assembly (2) is formed as a hollow cylindrical housing (4) with both ends open which in the preferred embodiment has a different diameter at each end (5). The cylindrical housing (4) has cutting blades (6) attached by screws (7) or other suitable attachment device. The cutting blades (6) are formed with a bend angle (8) to place the tips (9) in position for cutting and removing materials from around a sprinkler head. The cylindrical housing (4) may also have grooves (10) located adjacent the cutting blades (6) to aid in directing materials being removed away from the sprinkler head.

In order to cut and remove materials from around the periphery of a sprinkler head the cutting assembly (2) is placed over and around a sprinkler head. The handle (3) is then used to rotate the sprinkler head edging device (1). This rotation causes the cutting blades (6) to penetrate the adjoining grass, weeds, dirt or like material and force the material up and over the cutting blades (6). The grooves (10) direct the material away from the sprinkler head.

The preferred embodiment discloses a cylindrical housing (4) with opposite ends (5) having different diameter exterior (11) and interior (12) wall dimensions. The cylindrical housing (4) is rotatably attached by a pin (14) to the handle (3) at the cutting assembly end (13). A slot (20) is formed in the housing (4) to allow rotation about the pin (14) and handle (3). The cylindrical housing is retained in position by slidable cap (15). The cap (15) has a two diameter step (16) for insertion into an end (5) and a relatively smaller end (5). Depending on the diameter of the sprinkler head to be trimmed, the cutting assembly (2) is rotated such that one of the cylindrical housing ends (5) is positioned at the bottom of the sprinkler head edging device (1).

While a two sized cutting assembly (2) has been described, a single diameter cutting assembly (2) which does not rotate about a pin (14) may also be used.

Referring to FIGS. 6 through 8, a single diameter cutting assembly (2) is illustrated. In this simple version of the sprinkler head edging device (1), the cutting blades (6) are straight and attached within a attachment groove (17) formed in the lower end (5) of the cylindrical housing (4). In this alternate embodiment the grooves (10) have been removed. The cutting assembly (2) is illustrated attached to the handle (3) by use of a threaded shaft (18) at the cutting assembly end (13). The cutting assembly (13)is closed at one end by top (21) has a threaded aperture (22) to engage shaft (18) and a nut (not shown) may also be threaded onto the shaft (18).

The handle (3) may have a "T" shape at the hand grip end (19) or other suitable shape to aid in rotating the sprinkler head edging device (1). The alternate embodiment cutting assembly (2) may also be attached to a powered rotational device (23) such as a rotating weed trimming device as illustrated in FIG. 8.

While the invention has been particularly shown and described with respect to the illustrated and preferred embodiments thereof, it will be understood by those skilled in the art that the foregoing and other changes in form and details may be made therein without departing from the spirit and scope of the invention.

I claim:

1. A device for removing grass, weeds, dirt and other materials from the periphery of a sprinkler head comprising:

a handle having a cutting assembly attached at one end thereof;

the cutting assembly comprising:

an approximately cylindrical shaped hollow housing; the housing having a different diameter exterior wall and interior wall at opposite ends of the housing; the housing rotateably attached to the handle; each end of the housing having a cutting blade attached thereto; and a means to retain the housing with one end oriented for removal of material.

2. The device as in claim 1 wherein the cutting blade is attached by a fastener.

3. The device as in claim 2 wherein the fastener is a screw threadably engaged with the housing.

4. The device as in claim 1 wherein the cutting blade having a bend angle for engagement of material to be removed.

5. The device as in claim 1 wherein the housing having a groove formed in an external wall thereof and the groove formed relative to the cutting blade to divert material away from the side of the housing.

6. The device as in claim 1 wherein the housing is attached to the handle by a pin and the housing having a slot therein through which the handle cutting assembly end passes when the housing is rotated.

7. The device as in claim 1 wherein the means for retaining is a slidable cap.

8. The device as in claim 1 wherein the housing having an attachment groove for attachment of a cutting blade.

* * * * *